Sept. 5, 1967  A. F. DANIELL  3,339,511
MARINE PLATFORMS AND SEA STATIONS
Filed March 25, 1966  12 Sheets-Sheet 1
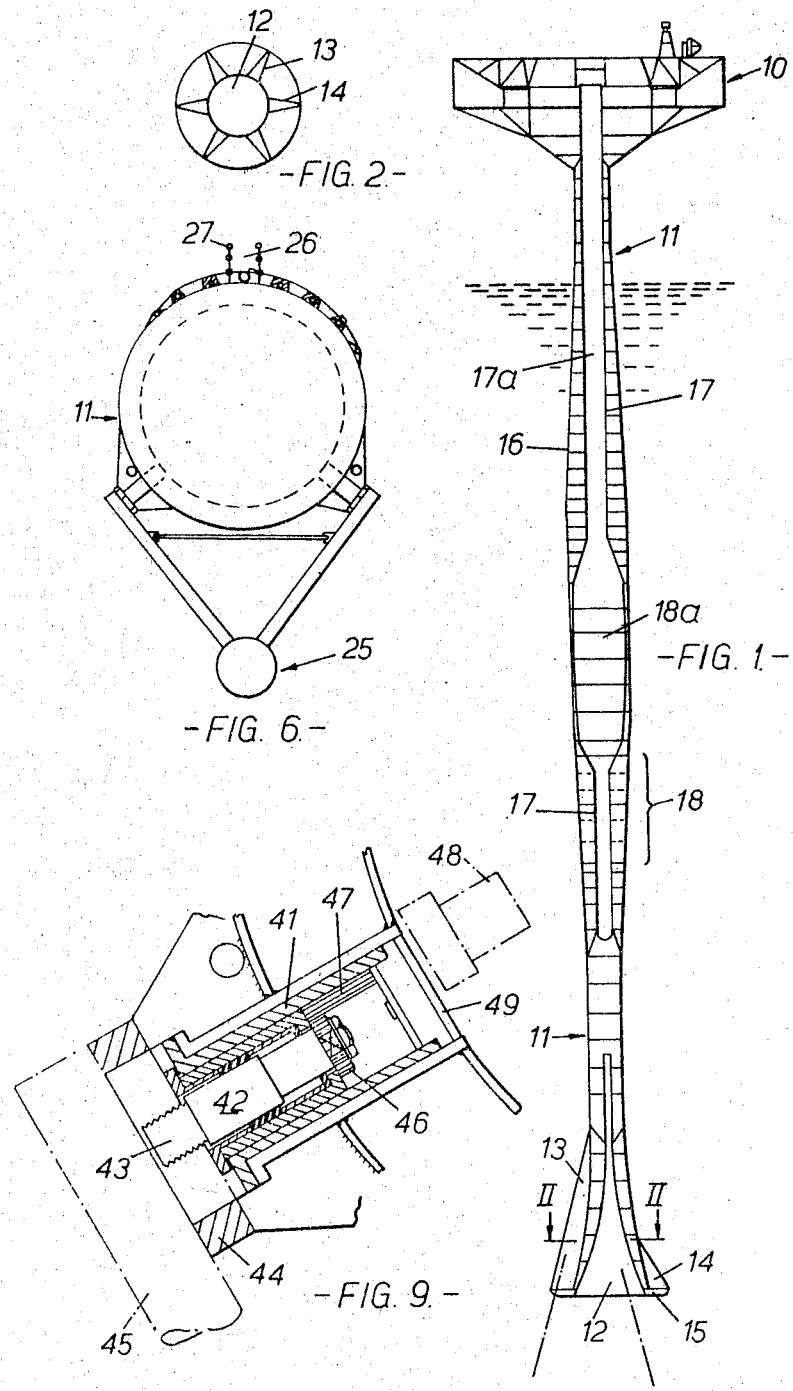
INVENTOR:
ALAN F. DANIELL
BY
Irmine and Smiley
ATTORNEYS

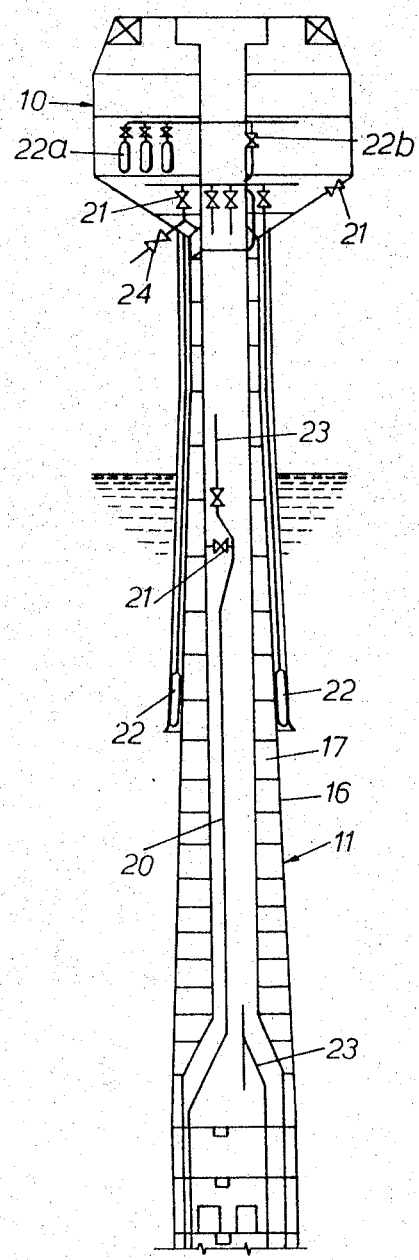
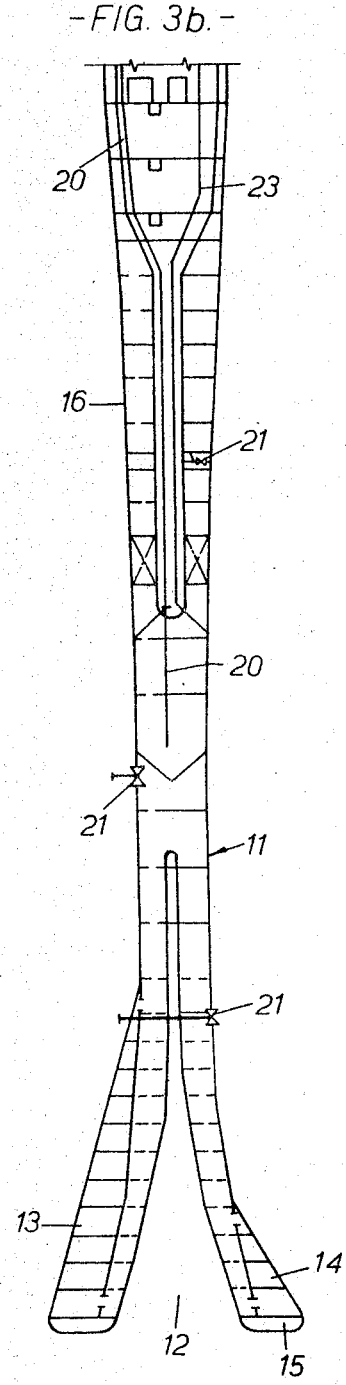

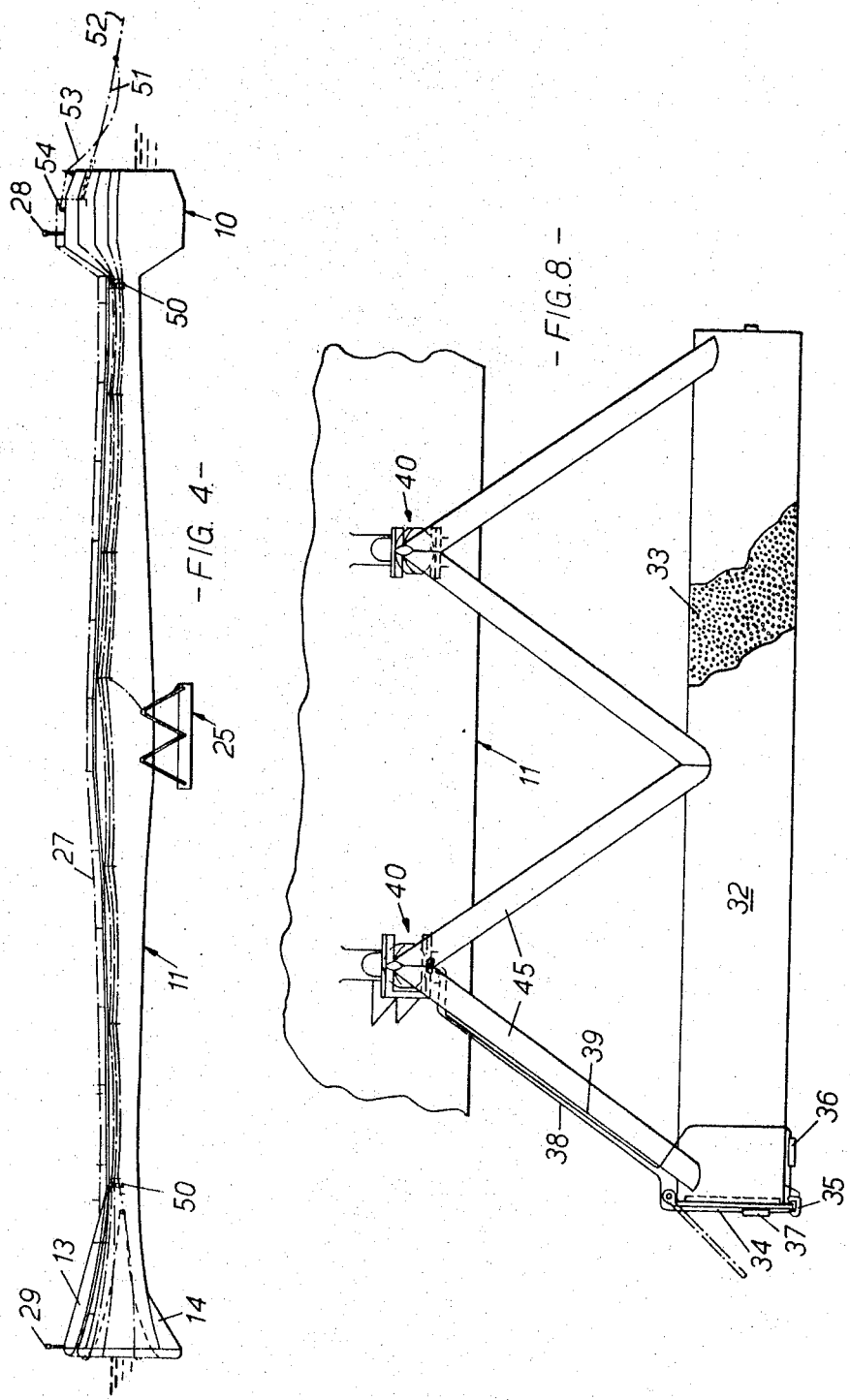

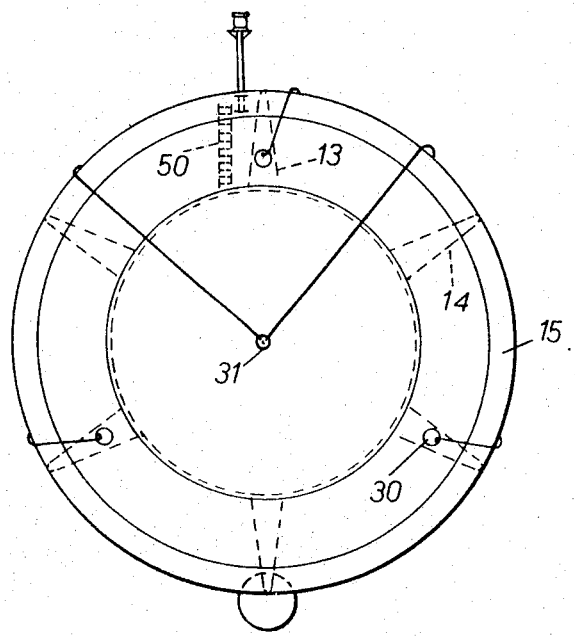
- FIG. 5. -
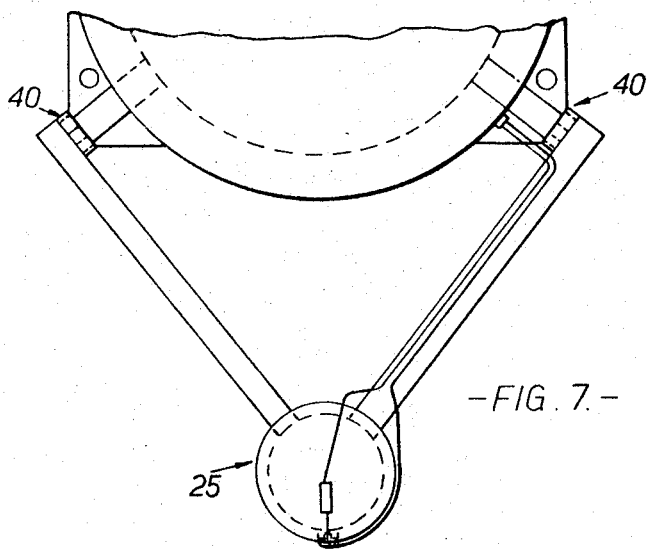
- FIG. 7. -

Sept. 5, 1967 A. F. DANIELL 3,339,511
MARINE PLATFORMS AND SEA STATIONS
Filed March 25, 1966 12 Sheets-Sheet 5
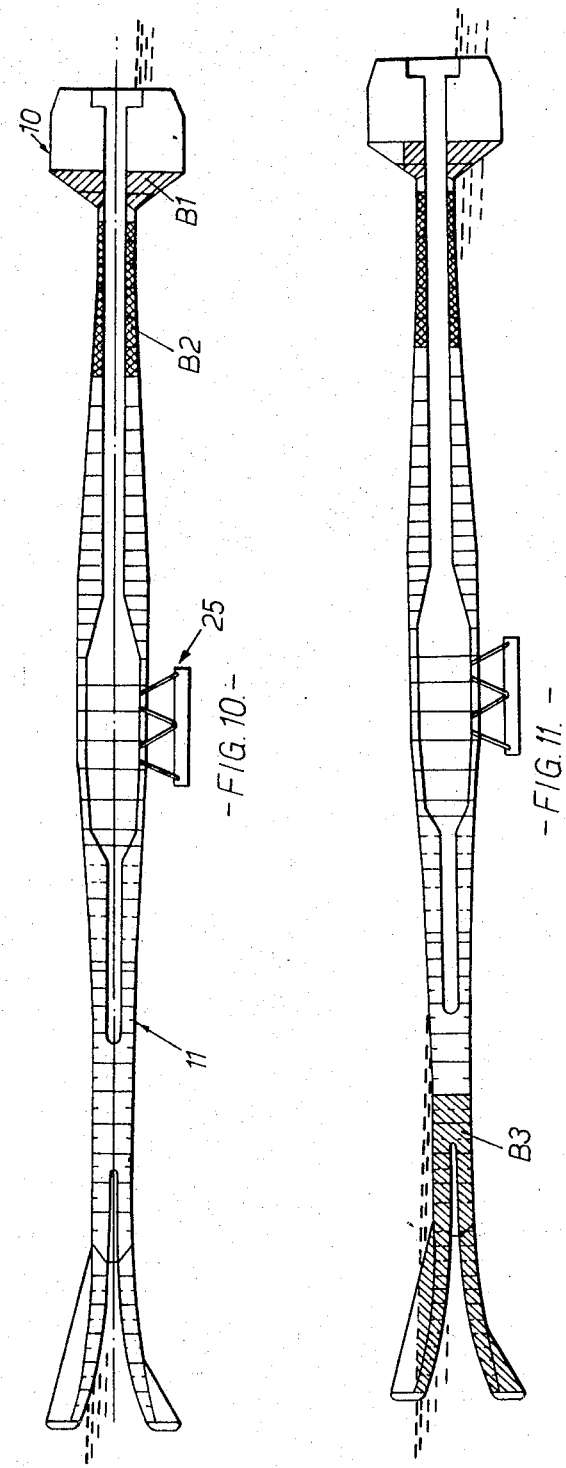
INVENTOR:
ALAN F. DANIELL
BY
ATTORNEYS Sept. 5, 1967  A. F. DANIELL  3,339,511
MARINE PLATFORMS AND SEA STATIONS
Filed March 25, 1966  12 Sheets-Sheet 6
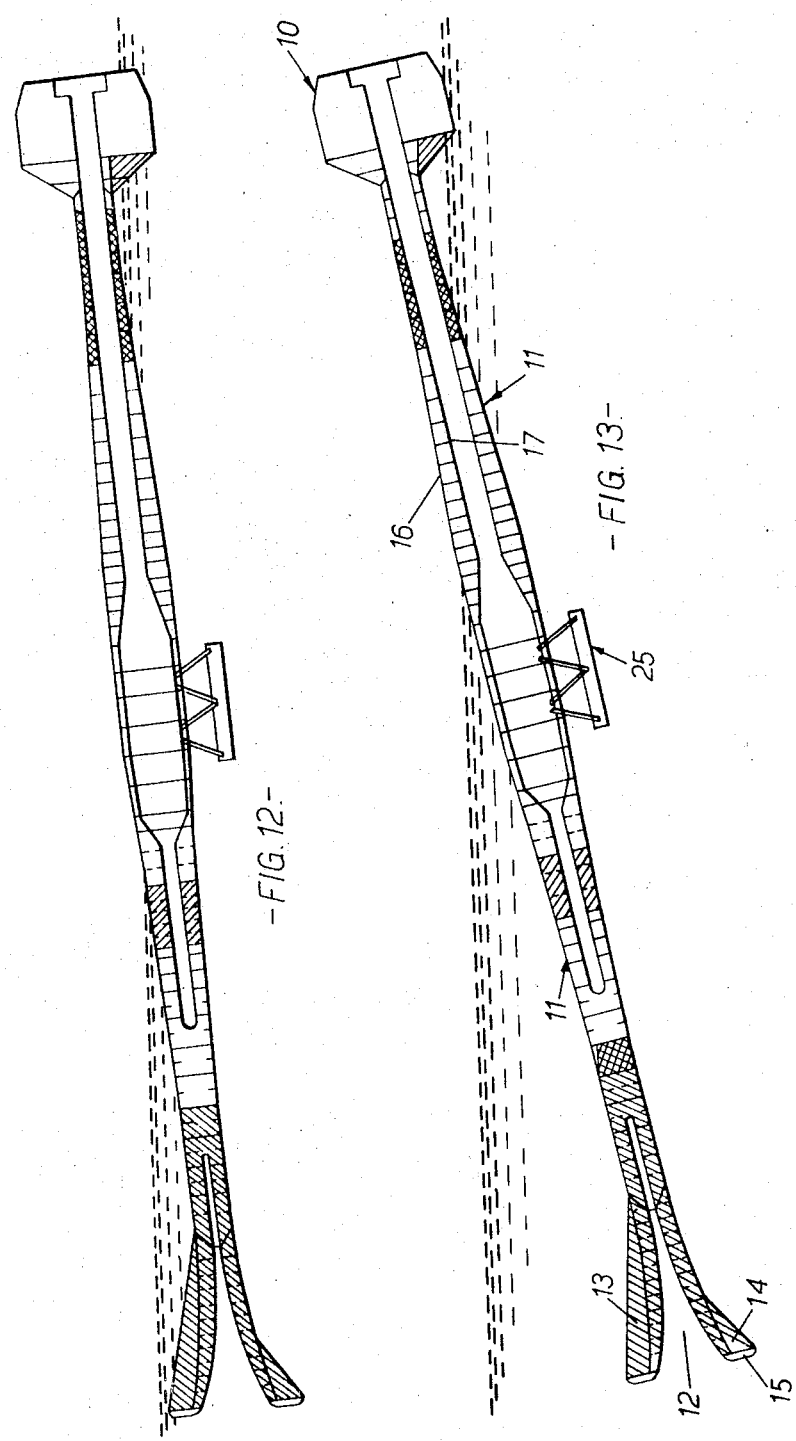
INVENTOR:
ALAN F. DANIELL
BY
ATTORNEYS Sept. 5, 1967  A. F. DANIELL  3,339,511
MARINE PLATFORMS AND SEA STATIONS
Filed March 25, 1966  12 Sheets-Sheet 7
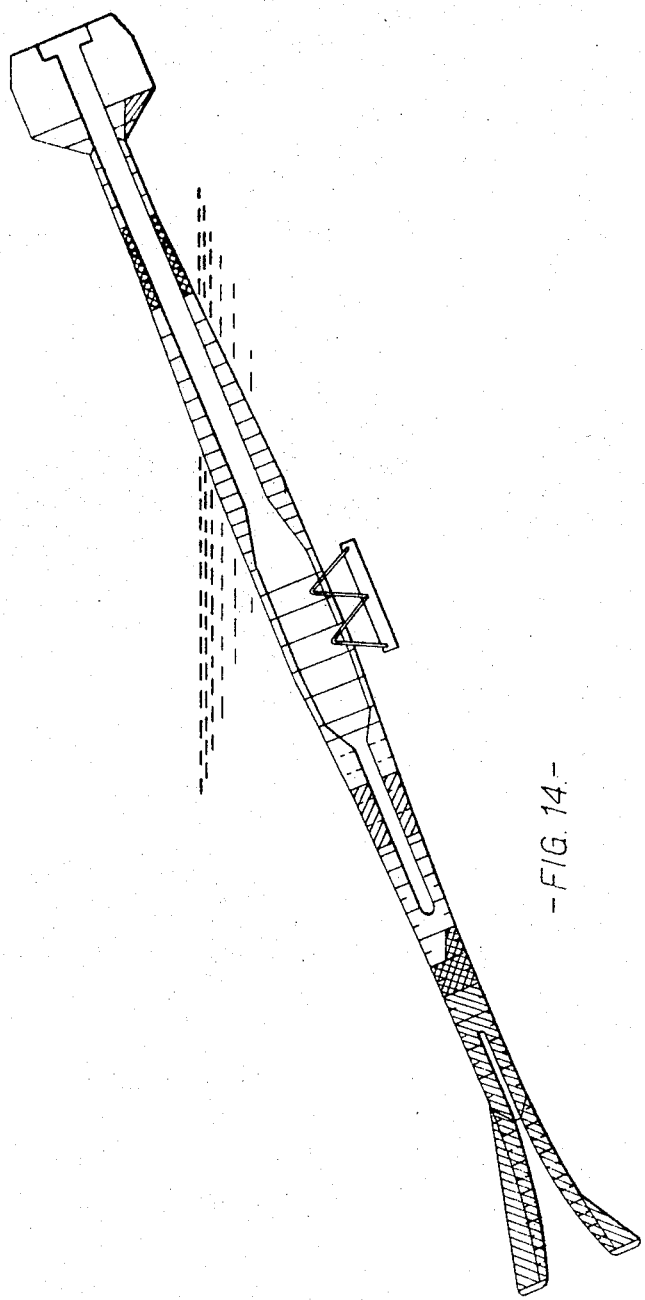
-FIG. 14.-
INVENTOR:
ALAN F. DANIELL
BY
ATTORNEYS Sept. 5, 1967 A. F. DANIELL 3,339,511
MARINE PLATFORMS AND SEA STATIONS
Filed March 25, 1966 12 Sheets-Sheet 8
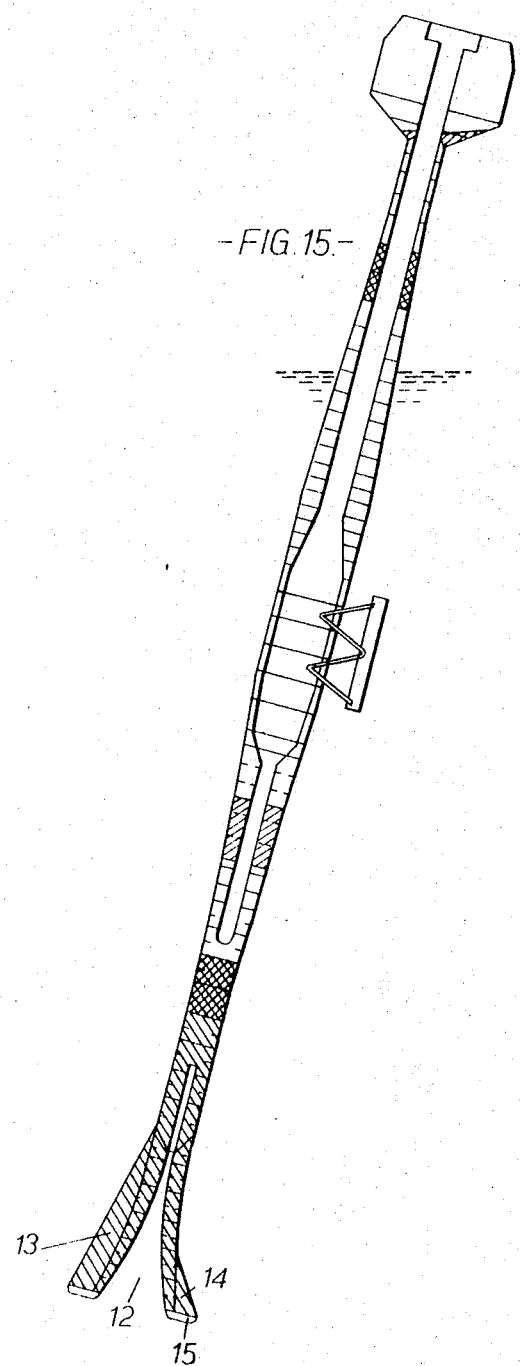
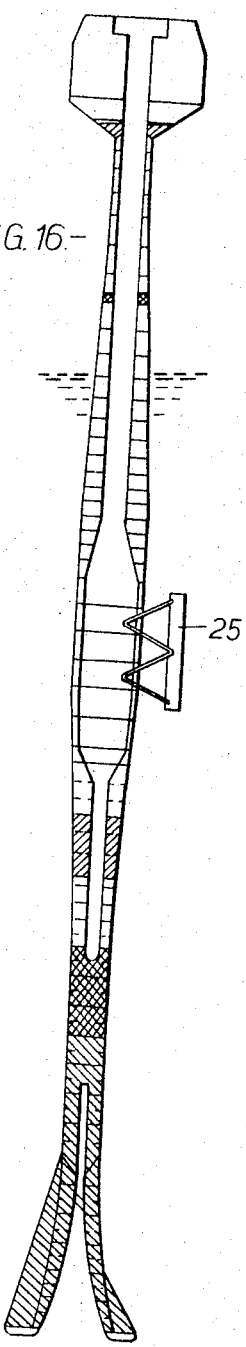
INVENTOR:
ALAN F. DANIELL
BY
ATTORNEYS

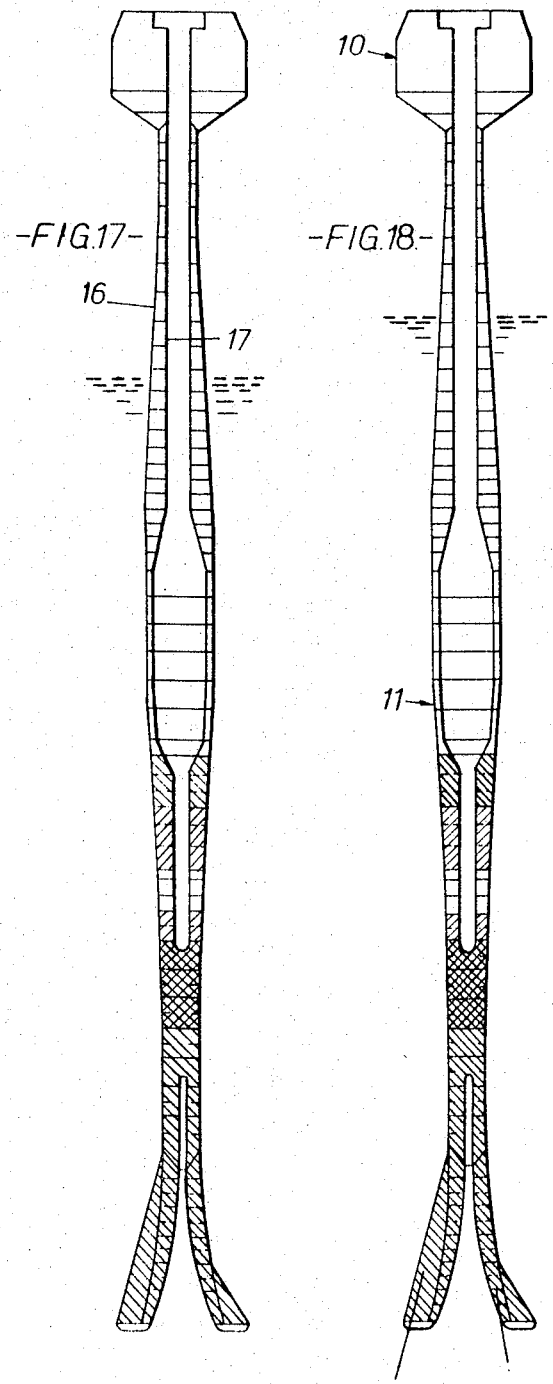

Sept. 5, 1967  A. F. DANIELL  3,339,511
MARINE PLATFORMS AND SEA STATIONS
Filed March 25, 1966  12 Sheets-Sheet 10

INVENTOR:
ALAN F. DANIELL
BY
ATTORNEYS

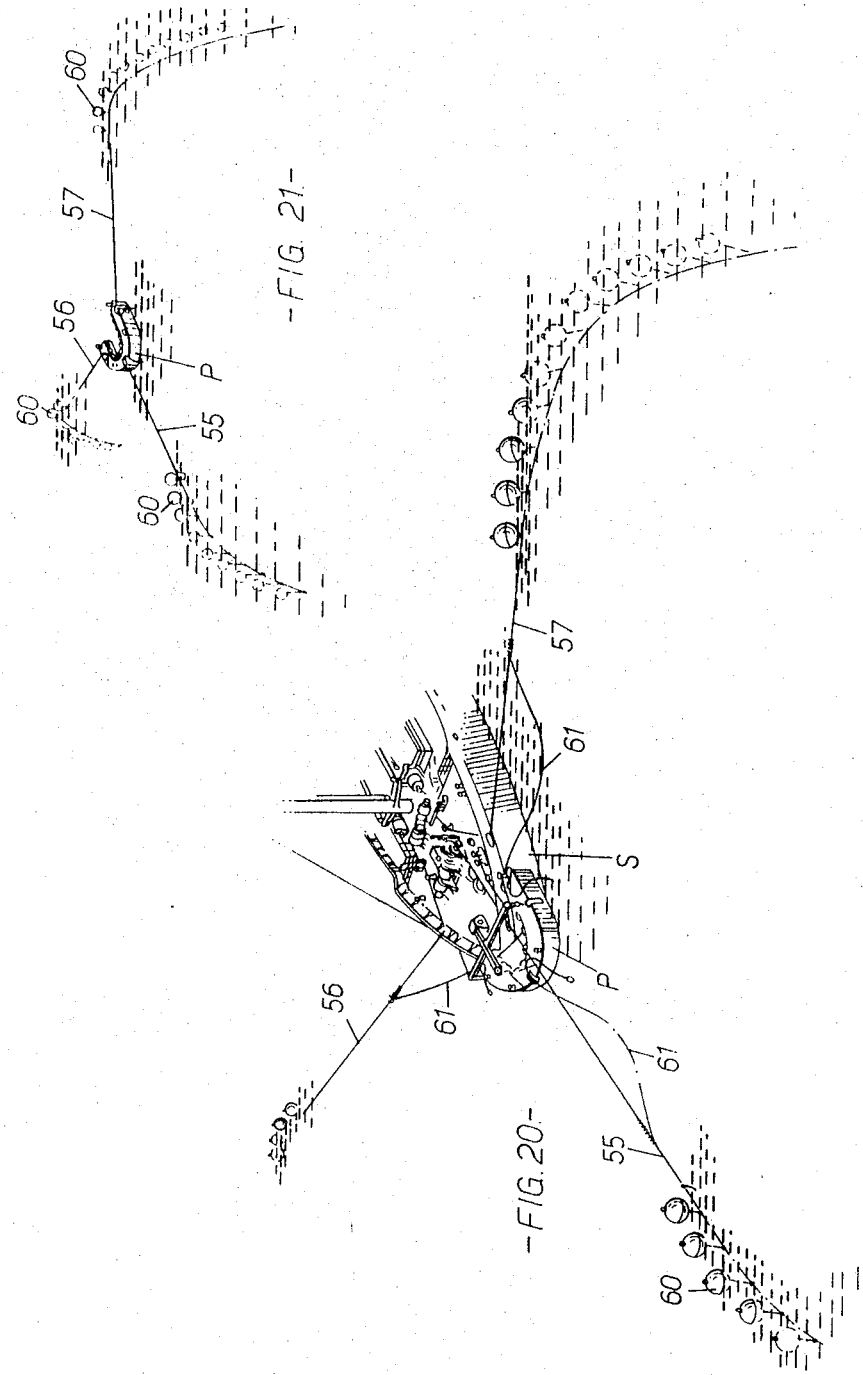

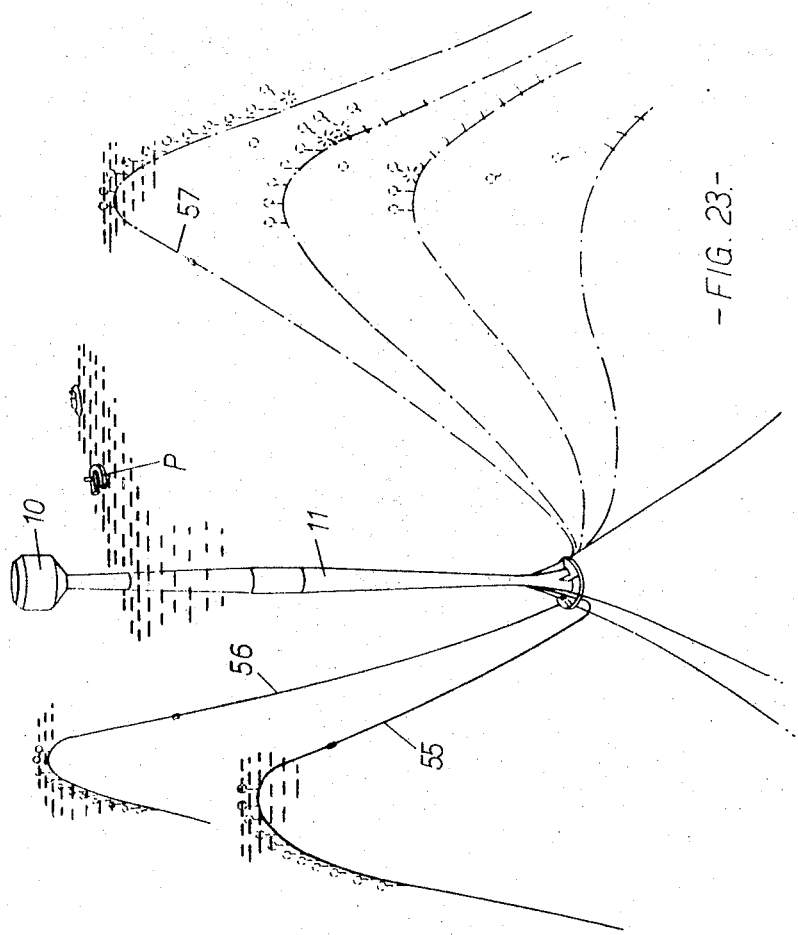

United States Patent Office 3,339,511
Patented Sept. 5, 1967

3,339,511
MARINE PLATFORMS AND SEA STATIONS
Alan F. Daniell, Birkenhead, England, assignor to Cammell Laird and Company (Shipbuilders and Engineers) Limited, Shipbuilding & Engineering Works, Birkenhead, Cheshire, England, a British company
Filed Mar. 25, 1966, Ser. No. 537,376
Claims priority, application Great Britain, Apr. 10, 1965, 15,344/65
21 Claims. (Cl. 114—.5)

This invention is for improvements in or relating to, marine platforms, sea stations and the like, hereinafter referred to as a sea station.

One particular application of the invention which is mentioned merely by way of example, is to a sea station for use as a very high frequency radio and submarine cable station for communication with, and navigation of aircraft and ships. Very high frequency radio systems, although highly efficient, have a relatively short range and cannot, therefore, be used for transmission over long distances between an aircraft or ship and the shore. The use of sea stations overcomes this difficulty.

Other uses of a sea station according to the invention are for undersea oil drilling, salvage or construction work in deep water and the establishment of offshore radar, or optical beacons for air and sea navigation, helicopter landing sites, offshore terminals and processing plants, e.g. for fish processing or mineral exploitation.

The invention is concerned with sea stations of the kind in which a buoyant partly submerged structure is moored by a cable or cables to a fixed anchorage or anchorages on the sea bed, the sea station proper being carried as a superstructure on the buoyant partly submerged structure.

Such sea stations can be located in deep waters where it is not practicable to support a platform or station on long extensible legs or columns set on the sea bed.

In a known form of sea station of the above kind a major part of the displacement is concentrated in a submerged hull structure (e.g. forty feet below sea level) while floating stability is achieved by provision of a number of large widely spaced vertical columns which support an elevated deck. Such designs roll and pitch much less than would a conventional ship form but, in order to achieve this stability, they must necessarily be of plan dimensions which are of the order of the length of the ocean waves. In practice such designs have displacements in the range of eight thousand of fifteen thousand tons and can carry loads of the order to two thousand to five thousands tons. Such designs are not, therefore, applicable to relatively small sea stations for which there is a requirement at the present time.

One object of the present invention is to meet this requirement.

According to the present invention there is provided a sea station comprising an elongated tubular hull capable of floating horizontally or vertically with its centre of gravity below its centre of buoyancy and a substantial part of its length immersed and having means whereby one of its ends can be flooded and its ballast thereby adjusted to bring it from the horizontal to the vertical, a keel-like member positioned on said hull so as to control the swing thereof, as it is being brought to the vertical, and means for releasing a part at least of the weight of said keel-like member as the hull approaches the vertical.

By arranging that the centre of gravity is below the centre of buoyancy, vertical stability is achieved and the motion under the effect of ocean waves is minimised by setting the greater part or a substantial part of the hull at depths where the motion of the water is greatly reduced.

When the hull is floating horizontally, so that the sea station can be towed to its location, longitudinal or pitching stability is achieved, as in the case of a ship, by the effect of the water plane area in raising the metacentre above the centre of gravity. If the elongated hull is of circular cross-section, which is one very convenient form for the purpose of the present invention, the metacentre in the transverse direction is on the principal axis and, if the masses are uniformly distributed, the centre of gravity is also on that axis so that there is a condition of neutral transverse stability. The addition of a heavy keel as set forth above will provide positive transverse stability.

When a part of an elongated tubular body is flooded to bring it towards the vertical the area of the water plane, where the hollow body intersects the water surface, decreases rapidly with the increase in the inclination of the principal axis to the horizontal so that the pitching stability rapidly decreases.

In known sea stations of the type with which the present invention is concerned, a condition is reached where, at a certain angle of inclination, the pitching stability becomes negative so that the hollow body swings in an uncontrollable manner until near the vertical attitude. This behaviour causes violent accelerations and strains on the structure of the hull and the equipment contained in it and is especially undesirable in large sea stations which may arrive at their location with communications equipment already installed in the upper part or sea station proper.

This uncontrolled swing is avoided, in accordance with the present invention, by the addition of the above-mentioned heavy keel so disposed as to ensure that the metacentric height in pitching is always positive and stability is maintained throughout the operation, of verting the hull (i.e. bringing it to the vertical), at all angles of inclination.

To avoid having to position such a keel at a considerable distance from the principal axis of the hull and therefore having to remove it before the hull can take up a truly vertical attitude, the keel is constructed, as above specified, so that a part at least of its weight can be disposed of as the hull approaches the vertical.

In preferred embodiments of the invention the part of the hull which is immersed when said hull is vertical, is provided with a plurality of circumferentially spaced radial longitudinally extending fins. These fins may be joined at or towards their lower ends by a circular or disc-shaped fin in a plane at right-angles to the principal axis of the hull.

In open oceans severe storms may produce wave energy at periods of up to about 25 seconds. The natural periods of oscillation of heave in the vertical direction and of pitching or angular motion in the vertical plane of the sea station should be substantially longer than that figure if the sea station is to have positive stability. This can be achieved by making the hull of very great length.

One object of the present invention is, however, to provide for the desired long natural periods of oscillation without using a hull of excessive length. This is achieved by the provision of the aforementioned fins which produce a large virtual mass acting at the lower end of the hull when vertical and effectively reduce the vertical and horizontal or lateral motion of that part of the hull over the whole range of periods of wave energy.

The vertical fins also have further functions, firstly, in increasing the effective moment of inertia of the vessel about the principal vertical axis and so reducing the yawing or rotational velocity and acceleration resulting from a short period disturbing force, such as a wind gust, and secondly in forming convenient points of attachment for mooring ropes which, to provide restraint against yawing, should be connected to the hull at points as far removed as possible from the principal vertical axis. It is convenient to run these mooring ropes through trunks formed in the vertical fins at or near the outer edges thereof, which outer edges are preferably substantially in alignment with the upper end of the catenary curve taken up by the mooring ropes.

A particular embodiment of the invention will now be described, by way of example, as applied to a sea station suitable for location where the depth of water may be, for example, 10,000 to 15,000 ft. In the following description reference is made to the accompanying diagrammatic drawings in which:

FIGURE 1 is an elevation showing the general outline of the sea station,

FIGURE 2 is a cross-sectional view through FIGURE 1 on the line II—II,

Figure 19:
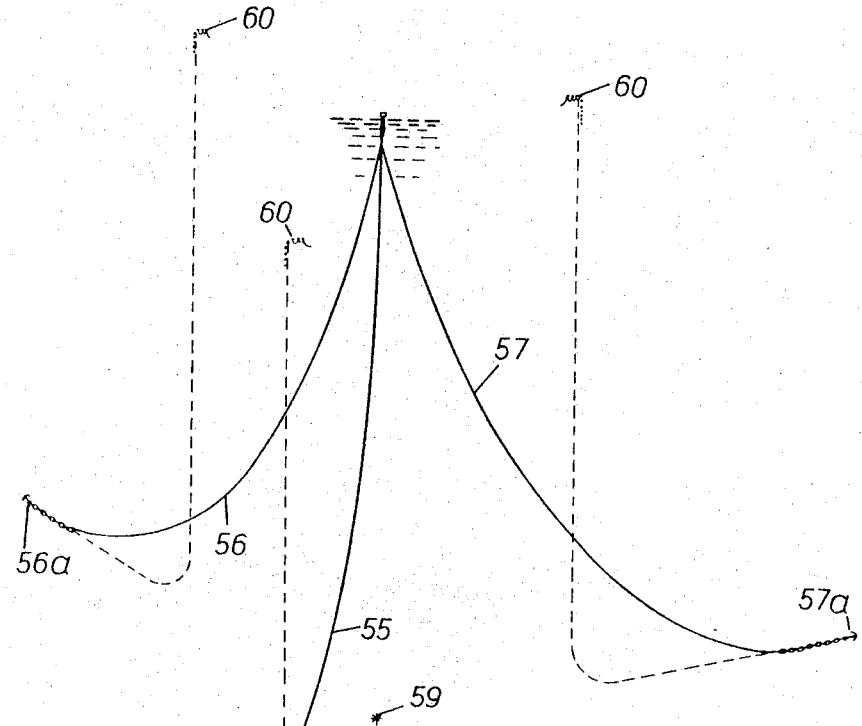

FIGURE 3a is an elevation of the upper part of the sea station showing more particularly the sea water and fresh water ballast system, FIGURE 3b is an elevation of the lower part of the sea station also showing more particularly the sea water and fresh water ballast system, FIGURE 4 is a side elevation of the sea station equipped and in its horizontal attitude for towing to its location, FIGURE 5 is an elevation of the left-hand or stern end of the sea station as seen in FIGURE 4, FIGURE 6 is a cross-sectional view through FIGURE 4 in way of the keel, FIGURES 7 and 8 are fragmentary detail views of the keel, FIGURE 9 is a detail of the keel securing and release mechanism, FIGURES 10 to 18 inclusive are diagrams illustrating the verting procedure, i.e. the procedure of bringing the sea station from the horizontal position shown in FIGURE 4 to the vertical position at its location, and FIGURES 19 to 23 inclusive are diagrams showing the procedure of mooring the sea station.

The sea station shown on the drawings comprises an upper structure or sea station proper 10, the upper part of which may constitute a flight deck below which there is accommodation for personnel and communications equipment.

The upper structure 10 is carried by a slender tubular steel column or hull 11 having a total length of, say, approximately 450 ft. The lower end of this column terminates in a bell-mouth 12 fitted with major and minor hollow fins 13 and 14 respectively spaced 60° apart around the hull. There is also a circular hollow fin 15 in a plane at right-angles to the axis of the column 11.

The hull 11 is constructed with external and internal shells 16 and 17 respectively, either of which is adequate to resist the external water pressure. A part 18 (see FIGURE 1) of the annular space between the shells 16 and 17 is divided by bulkheads to form oil fuel storage tanks. The rest of the annular space between the external and internal shells 16 and 17 is divided by bulkheads into a plurality of compartments some of which may be used as fresh water and sea water ballast tanks as will be described more particularly hereafter with reference to FIGURES 10 to 18. Water ballast compartments are also formed in the fins 13, 14 and 15.

A local widening of the hull 11 at, say, approximately midway between its upper and lower ends, provides space at 18a for main machinery decks, this space being accessible from the superstructure 10 by way of a shaft 17a within the inner shell 17. A lift may work in this shaft.

Instead of water ballast some of the ballast tanks may contain permanent concrete ballast.

To vert the sea station means are provided for taking in sea water ballast and transferring ballast between the ballast tanks. These arrangements are shown more particularly in FIGURES 3a and 3b in which the reference numeral 20 indicates water ballast transfer and intake pipes, the reference numeral 21 water ballast control valves in said pipes and the reference numeral 22 submersible type salt water pumps for taking in sea water ballast. The reference numeral 23 indicates vent pipes for the sea water and fresh water ballast system. A fresh water filling point is indicated at 24. The valves 21 not only control the transfer of water ballast but also, of course, serve to isolate appropriate tanks as and when required.

For towing the vessel is fitted out as shown in FIGURE 4. In particular it should be noted that it is provided with a keel 25, a cat walk 26 (see FIGURE 6), provided with guard rails 27, and navigation lights 28 and 29. Furthermore, prior to towing the station to its location upper sections of its mooring ropes and submarine cable messenger ropes are slung along its length as shown in chain lines in FIGURE 4. At the bell-mouth end of the vessel the mooring wires are taken through and secured in trunks or ducts 30 in the fins 13 (see FIGURE 5) and the submarine cable messenger ropes are taken through a central hole 31 in the bell-mouth and lead back to the superstructure 10. During towing the hole 31 is temporarily sealed. The messenger and mooring ropes are lashed in position, using wooden chocks during towing as shown more particularly in FIGURE 6.

The keel 25 (see FIGURES 7 and 8) comprises a hollow cylindrical container 32 filled with iron shot or other suitable heavy material 33 in the form of small particles. It may be desirable to fill the spaces between and around the particles with oil or other suitable liquid to prevent corrosion or seizure of the particles within the container 32. The container 32 has a closure or door 34 through which the shot 33 can be discharged as hereinafter described. The door has a locking means 35 and a remotely operable hydraulic actuator for releasing the locking means and a further hydraulic actuator 37 for positively opening the door. These hydraulic actuators are connected through a hydraulic system comprising pipes 38, 39 to a remote control station.

The keel structure 25 is not a permanent part of the sea station and is connected to the hull 11 by four releasable securing devices 40, one of which is shown in detail in FIGURE 9. The securing device shown in FIGURE 9 comprises a pressure-type gland 41 in which is held a bolt 42 having a screw-threaded part 43 which screws into a part 44 of the keel support structure 45. The bolt 42 has secured to it a gear-wheel 46 which meshes with a gear-wheel 47 adapted to be rotated by an operating member 48.

When it is desired to unship the keel the gearing 46, 47 is operated by the member 48 so as to screw the bolt 42 out of the part 44 of the keel supporting structure. This operation is, of course, effected from the part of the interior of the hull available to personnel and when it has been completed the apertures 49 in the inner shell 17 are welded up.

For towing, the vessel is provided (see FIGURE 4) with a towing bridle 51, a towing cable 52 and a towing cable recovery line 53. A hand winch 54 is associated with the recovery line.

For use during towing the vessel is provided with temporary ladders 50.

On arrival at its location the vessel is brought relatively smoothly and under control from its horizontal to its vertical position. This is effected by flooding the compartments towards the lower end of the station and otherwise transferring the water ballast so that the trim of the vessel changes and the lower end sinks below the surface as flooding proceeds, the vessel eventually taking up a near vertical attitude. This procedure and the maner in which the flooding of the ballast compartments and the transfer of water ballast from one compartment to another is shown in FIGURES 10 to 18. In these figures the left to right hatching B1 represents internal fresh water ballast transfer from compartments in the superstructure 10, the cross-hatching B2 represents internal fresh water ballast transfer from the superstructure end of the hull and the right to left hatching B3 represents external sea water flooding.

Blowing, i.e. the transfer of water ballast from the upper tanks is effected by the use of compressed air stored in bottles 22a, the air flowing to the uppermost tank under the control of a valve 22b and then passing from tank to tank as required. After a certain stage in the verting operation the use of air is no longer necessary as the water ballast will then flow by gravity into the required compartments.

The transfer of water ballast and flooding is carried out so that the upper part of the hull does not emerge totally until the displacement is substantially the same as the final displacement so that bending stresses in the hull are kept to a minimum.

On completion of the ballasting operation when the vessel is near the vertical attitude, the door or hopper valve 34 at the lower end of the keel 32 is opened, permitting the shot to escape so that the vessel finally takes up its truly vertical attitude. The keel is then unshipped as previously described and recovered for use on another hull.

Having verted the sea station the next step is to moor it to the sea bed.

The moorings in the particular arrangement shown in FIGURES 19 to 23 consist of three steel ropes 55, 56 and 57 spaced 120° apart and having their lower ends connected respectively to anchors or clumps 55a, 56a and 57a on the sea bed and their other ends connected to the floating sea station. The lengths of the moorings are selected in relation to the spacing of the anchors so that part of each mooring extends in a catenary curve from the sea bed to the station. Each rope is, therefore, in tension at all times and the horizontal mooring forces on the floating station are resisted by the combined horizontal components of the tensions in the ropes, while the vertical components of these tensions are resisted by the buoyancy of the floating vessel. Variations in the horizontal tension components in the ropes are accompanied by changes in the lengths and forms of the suspended parts thereof and the moorings therefore offer a resilient restraint and accommodate changes in the mooring forces without snatch or large variation in stress in the components of the moorings.

For use in carrying out the mooring procedure hereinafter described there is provided a temporary pontoon P (see FIGURES 20 to 23) of horseshoe or U form which is removed after mooring of the sea station has been completed. For some purposes, however, a permanent mooring buoy may be required.

Referring now to FIGURE 19, in which the dotted lines show the moorings being laid and the full lines the moorings complete, the operation of laying the mooring is as follows:

The first anchor 55a, with the first mooring rope attached, is lowered to the sea bed at the desired location as determined from the laying vessel S (FIGURE 20) by the usual navigational procedures or with reference to a sonic marker 59 (FIGURE 19) previously laid on the sea bed. The laying vessel then proceeds in the direction of the centre of the mooring rope arrangement paying-out wire as she proceeds. When a determined length of wire, depending on the water depth and the desired anchor spacing, has been payed out, a clamp is attached to the wire and a buoy 60 is attached to the clamp by a short strop which includes a release device which can be set to open at a predetermined hydrostatic pressure. Since the buoy 60 is required to withstand the pressure at a considerable depth of water, it is conveniently in the form of a hollow steel sphere.

Further similar buoys 60 are attached to the wire rope at intervals of about 40 ft. the total number of buoys being such that their combined buoyant power exceeds the submerged weight of the whole length of the mooring. After the last buoy has been attached to the end of the mooring, said end is fitted with a joining shackle or other coupling device and the mooring is cast overboard.

At this stage the mooring takes up the position as indicated by the dotted lines in FIGURE 19, with part of the mooring resting on the sea bed and part running nearly vertical to the surface where it is supported by the assembly of buoys 60, most of which are submerged. Since the larger proportion of the buoys are submerged to a considerable depth, the motions and the stresses on the wire resulting from waves at the surface are much reduced as compared with those which would occur had a single large buoy been employed.

The laying vessel then proceeds in turn to the location of the second and third anchors 56a and 57a and repeats the procedures of laying two further moorings as just described.

The accurate placing of the anchors 55a, 56a and 57a can be facilitated by the use of sonic devices incorporated in or attached to each anchor together with suitable equipment in the laying vessel. These devices can be of short life duration and are required only to respond on receipt of an interrogating signal from the vessel S and are used only to measure distances and not bearings.

At the end of this stage of the operation the three arms 55, 56 and 57 of the moorings are widely spaced so that they will not foul one another and as they are little affected by waves, they may, if desired, be left in this position for a considerable time without risk of damage from the weather.

The mooring vessel with the pontoon P slung from suitable attachments at the fore-part as shown in FIGURE 20, then proceeds in turn to each of the arms of the mooring arrangement for the attachment of each arm to the pontoon as is shown in FIGURE 20. Wires 61 are temporarily attached to the moorings for this operation.

The pontoon is then cast off from the vessel so that it floats near the centre of the mooring arrangement (see FIGURE 21) with the three mooring ropes 55, 56 and 57 running nearly horizontally to the upper ends of the buoy assemblies 60, thence descending in an inverted catenary over the buoyed length and then by normal catenary to the sea bed.

Figure 22:
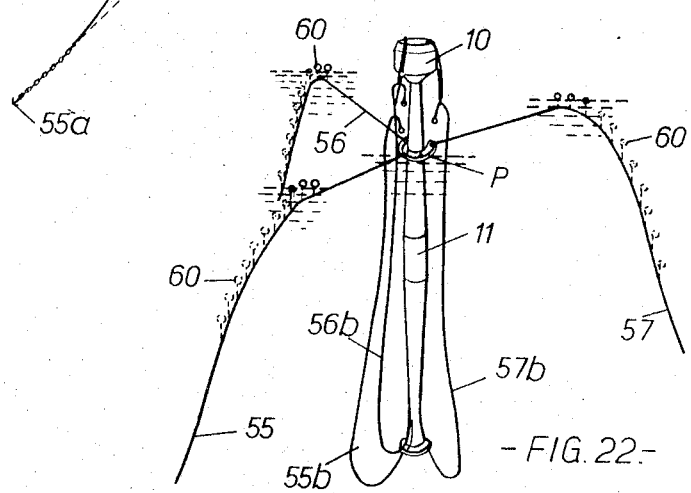

Lines are now passed from the sea station to the pontoon and the sea station then warps herself into the recess in the pontoon using her own winches. The seat station is then secured to the pontoon as shown in FIGURE 22.

The outboard ends of the short mooring ropes (shown in chain lines in FIGURE 4 and indicated at 55b, 56b and 57b in FIGURE 22) are then lowered from the upper deck of the sea station to the pontoon and coupled to the ends of the long mooring ropes 55, 56 and 57 which are held in special fittings on the pontoon. When all three mooring ropes have been so coupled they are released simultaneously from the pontoon and the horizontal tension component in the long sections causes the buoy assemblages to move outwards, finally taking up the positions shown in FIGURE 23. The pontoon can then be towed away.

As the moorings sink, the buoys 60 are released in turn, the lowermost first, by actuation of the hydrostatic devices by which they are attached to the moorings. The number, spacing and depth setting of the buoys is so arranged that the descent of the moorings is gradual without shock.

The final position of the mooring is as shown in full lines in FIGURE 19.

I claim:

1. A sea station comprising an elongated tubular hull capable of floating horizontally or vertically, and when floating vertically having its centre of gravity below its centre of buoyancy and a substantial part of its length immersed, means whereby one end of said hull can be flooded and its ballast thereby adjusted to bring it to the vertical, a keel-like member fixed to and extending from the exterior of said hull so as to control the swing thereof, as it is being brought to the vertical, and means for releasing a part at least of the weight of said keel-like member as the hull approaches the vertical.

2. A seat station as claimed in claim 1 wherein flooding of the one end of the hull, to bring it to the vertical, is achieved, at least in part, by providing means whereby internal water ballast can be transformed from one part of the hull to another.

3. A sea station as claimed in claim 2 wherein the hull is divided into a plurality of compartments and means is provided for transferring water ballast from some of said compartments to others in such a way that some control is provided of the movement of the hull from its horizontal position towards its vertical position.

4. A sea station as claimed in claim 3 wherein said compartments are provided in a space between inner and outer shells of the hull.

5. A sea station as claimed in claim 1 wherein the keel-like member is in the for of a container having a closure member which is openable, for the discharge from the interior of the keel-like member of heavy matter, in particle form, constituting the greater part of its weight, during verting of the hull.

6. A sea station as claimed in claim 5 wherein said closure member is openable remotely.

7. A sea station as claimed in claim 1 wherein the keel-like member has means securing it to the hull which can readily be operated to detach it from the hull.

8. A sea station as claimed in claim 7 wherein said means is operable from the interior of the hull.

9. A sea station as claimed in claim 1 wherein on the part of the hull which is immersed when said hull is vertical, at least three circumferentially spaced radial logitudinally extending fins are provided.

10. A sea station as claimed in claim 9 wherein said fins are joined at or towards their lower ends by a circular or disc-shaped fin in a plane transverse to the axis of the hull.

11. A sea station as claimed in claim 9 wherein the radial fins have trunks on their outer edges through which pass mooring ropes for the sea station.

12. A sea station as claimed in claim 11 wherein said outer edges of the fins are shaped so as to align with the catenary curve of the upper ends of the mooring ropes.

13. A sea station as claimed in claim 1 wherein the end of the hull which is lowermost when it is vertical is of hollow bell-like form.

14. A sea station as claimed in claim 1 and having at least three mooring ropes spaced radially around it and having upper ends connected to the sea station and lower ends connected to anchors on the sea bed, the length of the mooring ropes being adjusted in relation to the relative positioning of the anchors so that a part of each rope spans in a catenary from the sea bed towards the sea station.

15. A sea station as claimed in claim 2 and having a compressed air system for blowing internal water ballast from one part of the hull to another.

16. A sea station as claimed in claim 1 and having means for taking in sea water ballast.

17. A method of positioning a sea station having a keel-like member fixed thereto, which method includes the steps of floating the sea station when horizontal to the vicinity of its location, adjusting the flooding and thereby the ballasting of the hull to bring it from its horizontal position towards its vertical position, reducing the weight of the keel-like member so that the hull moves steadily into its vertical position and then mooring the hull to anchorages on the sea bed.

18. The method claimed in claim 17 wherein the hull is moored to the sea bed by laying a plurality of spaced moorings and temporarily supporting each by a series of buoys, attaching the moorings to the sea station and then progressively releasing said buoys.

19. The method claimed in claim 18 wherein the buoys are attached to the moorings by hydrostatic pressure automatic release devices.

20. The method claimed in claim 17 wherein correct positioning of the anchorages on the sea bed is determined by reference to a sonic marker apparatus previously laid on the sea bed.

21. The method claimed in claim 17 wherein a temporary pontoon of U-form is employed to receive and hold the vertical sea station during the attachment of moorings thereto.

References Cited
UNITED STATES PATENTS 3,256,537  6/1966  Clark _____ 9—8
3,273,526  9/1966  Glosten _____ 114—0.5

MILTON BUCHLER, *Primary Examiner.*

T. M. BLIX, *Assistant Examiner.*